UNITED STATES PATENT OFFICE.

INGOMAR F. ORTON, OF GALVESTON, TEXAS.

METHOD OF EXTERMINATING GRASSES, WEEDS, OR PLANTS.

1,173,019.

Specification of Letters Patent.

Patented Feb. 22, 1916.

No Drawing.

Application filed December 27, 1913. Serial No. 809,101.

*To all whom it may concern:*

Be it known that I, INGOMAR F. ORTON, a citizen of the United States, residing at Galveston, in the county of Galveston and State of Texas, have invented new and useful Improvements in Methods of Exterminating Grasses, Weeds, or Plants, of which the following is a specification.

My invention relates to a method of exterminating Johnson grass and other weeds and plants, and its object is to provide a method whereby noxious grasses, weeds and plants growing in fields and along railway tracks, roads and highways may be quickly, conveniently and economically destroyed.

In carrying my invention into practice, I subject the growing vegetation to the action of an agent which, I have discovered, possesses peculiar properties in effecting the rapid and certain destruction of vegetable growth. This agent is a concentrated solution of arsenic pentoxid ($As_2O_5$), which is sprayed or otherwise applied to the grass, weeds or plants, resulting in their destruction within a comparatively short period.

In practice, an arsenic pentoxid solution of approximately 80% strength is usually employed and is found most efficient for killing Johnson grass and other tough and refractory plant life, but solutions of a weaker strength are sufficient in many cases and I therefore do not limit the invention to the use of a solution of the particular strength mentioned.

The use of arsenic in any other form, alone or in conjunction with oxidizing agents, such as potassium or sodium bicarbonate, carbonate and nitrate, or other combinations in the absence of an acid material, is uncertain and ineffective as an agent in destroying vegetation of the character defined, while I have found that an arsenic pentoxid solution of 80% strength, or even weaker, is rapid and certain in action in destroying noxious vegetable life of the most refractory character.

The solution of arsenic pentoxid may be applied to the plants in any ordinary way, such as by spraying the plants with the solution in the customary manner. In this way the entire plant and the ground surrounding the plant will be treated with the liquid.

It will be noted that by reason of the acidity of the liquid, and also by reason of the strength of the liquid, the material which I employ is much superior to a solution of arsenic trioxid in sodium bicarbonate solution, sodium carbonate solution or caustic soda, since the arsenic dissolved in an alkali produces a substantially neutral solution which is of very much less strength than the solution which I employ.

It has been found that the process constituting the present invention is of particular value, as applied to the treatment of railroad road beds, since the solution of arsenic pentoxid acts to preserve the railroad ties, and also acts to preserve the roadbed itself, against the destructive action of growing weeds.

While I have described the use of a solution of 80% strength, I do not limit myself to such a strength of solution, and will state that excellent results are also obtained by the use of solutions of materially less strength, solutions of from 40 to 80% strength being found to be very suitable for the process.

I claim:—

The herein described process of destroying vegetation, which comprises applying to said vegetation, arsenic pentoxid in the form of a concentrated solution.

In testimony whereof I affix my signature in presence of two witnesses.

INGOMAR F. ORTON.

Witnesses:
L. M. WEISS,
W. E. FARROW.